No. 702,169. Patented June 10, 1902.
H. B. WILLIAMS.
DREDGE BOX.
(Application filed Oct. 19, 1901.)
(No Model.)
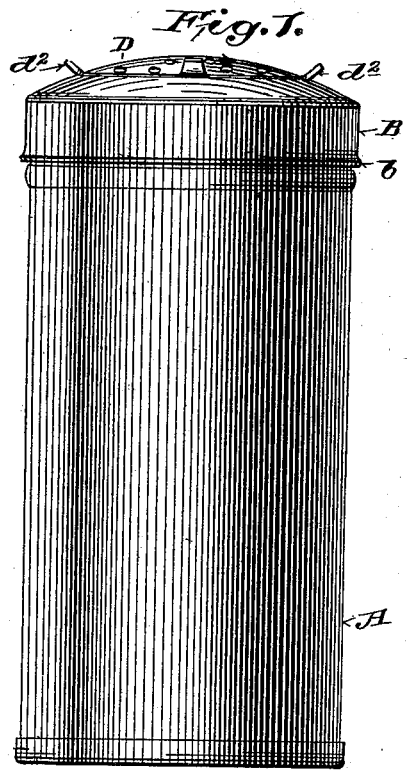
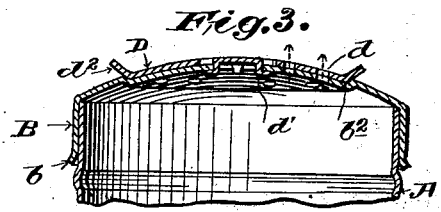
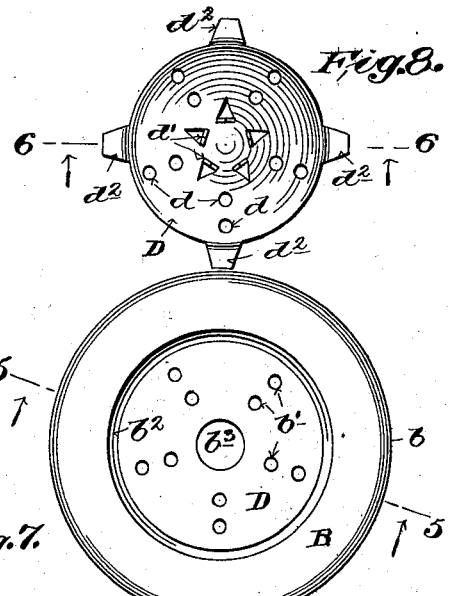
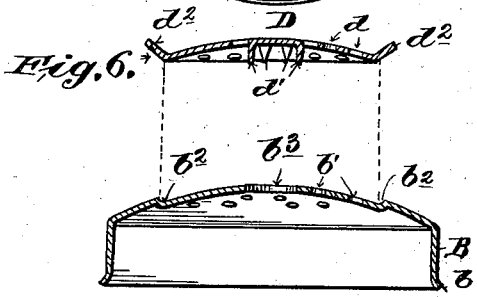
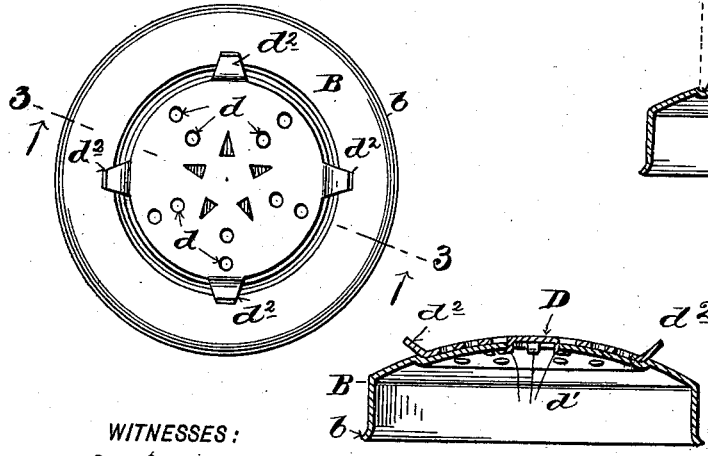
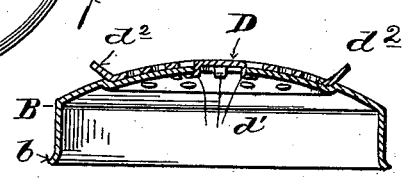
WITNESSES:
INVENTOR
Harry B Williams

UNITED STATES PATENT OFFICE.

HARRY B. WILLIAMS, OF NEW YORK, N. Y., ASSIGNOR TO AMERICAN CAN COMPANY, A CORPORATION OF NEW JERSEY.

DREDGE-BOX.

SPECIFICATION forming part of Letters Patent No. 702,169, dated June 10, 1902.

Application filed October 19, 1901. Serial No. 79,297. (No model.)

*To all whom it may concern:*

Be it known that I, HARRY B. WILLIAMS, a citizen of the United States, residing in New York city, in the county of New York and State of New York, have invented a new and useful Improvement in Dredge-Boxes, of which the following is a specification.

My invention relates to improvements in dredge-boxes or powder-boxes.

The object of my invention is to produce a dredge-box having a perforated cover and rotary closing-plate which will be of a simple and cheap construction and composed of few parts, while durable and efficient in operation.

My invention consists in the novel construction and combination of parts herein shown and described, and specified in the claims.

In the accompanying drawings, forming a part of this specification, Figure 1 is a side elevation of a dredge-box or powder-box embodying my invention. Fig. 2 is a plan view. Fig. 3 is a central vertical section on line 3 3 of Fig. 2, showing the perforations open. Fig. 4 is a similar view showing perforations closed. Fig. 5 is a sectional view of the cover, taken on line 5 5 of Fig. 7. Fig. 6 is a detail sectional view of the rotary perforated plate, taken on line 6 6 of Fig. 8 and showing its form before being applied and secured to the cover. Fig. 7 is a detailed plan of the cover. Fig. 8 is a detailed plan view of the rotary plate.

In said drawings, A represents the box or can, same being of any suitable construction and made, preferably, of sheet metal.

B is the cover, the same having a flange $b$ to fit the box A. The cover B also has radial rows of perforations $b'$ and a countersink $b^2$ to receive the rotary perforated closing-plate D and a central hole $b^3$. The rotary closing-plate D is provided with radial rows of perforations $d$, adapted to register with the perforations $b'$ in the cover B when the plate D is properly turned. The rotary plate D is also provided with a series of integral lips $d'$, which pass through the central hole $b^3$ and are turned or clenched outward, as is clearly shown in Figs. 2, 3, and 4, to secure the rotary plate D to the cover. The series of integral lips or projections $d'$ on the rotary plate thus form together a substantially round or circular pivot for the rotary plate to turn upon. The rotary plate D is also provided with upturned lips or projections $d^2$, which serve as handles or thumb-pieces to turn plate D to open or close the box.

I claim—

1. The dredge-box comprising in combination a box A, perforated cover B, having a central opening and rotary perforated closing-plate D, having a central portion closing said central opening in the cover B and furnished with a series of integral lips projecting through the central opening in the cover, and turned or clenched to rotatably secure the plate to the cover, substantially as specified.

2. The combination with the perforated cover B having a central opening of rotary perforated closing-plate D, having a central portion closing said central opening in the cover B and having integral lips $d'$ turned or clenched to rotatably secure the plate to the cover, said cover being provided with a countersink to receive the plate substantially as specified.

3. The combination of perforated dredge-box, cover B having a central opening, having a countersink to receive a rotary plate, and a rotary plate D having a central portion closing said central opening in the cover B and having integral lips inserted through the central opening in the cover, and turned or clenched to rotatably secure the plate to the cover, said plate being also provided with upturned lips or projections for turning the plate substantially as specified.

HARRY B. WILLIAMS.

Witnesses:
GEO. R. WEED,
E. W. MORSSIEAU.